United States Patent
Chow et al.

(10) Patent No.: US 10,171,298 B2
(45) Date of Patent: Jan. 1, 2019

(54) MANAGEMENT CENTER FOR COMMUNICATION SYSTEM CUSTOMER PREMISES EQUIPMENT

(76) Inventors: Peter Chow, Los Altos, CA (US); Wonjong Rhee, San Francisco, CA (US); Ardavan Maleki Tehrani, Menlo Park, CA (US); Marc Goldburg, Redwood City, CA (US); Georgios Ginis, San Mateo, CA (US); Mehdi Mohseni, Menlo Park, CA (US)

(*) Notice: Subject to any disclaimer, the term of this patent is extended or adjusted under 35 U.S.C. 154(b) by 36 days.

(21) Appl. No.: 13/995,901

(22) PCT Filed: Dec. 30, 2010

(86) PCT No.: PCT/US2010/062604
§ 371 (c)(1),
(2), (4) Date: Nov. 11, 2013

(87) PCT Pub. No.: WO2012/091725
PCT Pub. Date: Jul. 5, 2012

(65) Prior Publication Data
US 2014/0098705 A1  Apr. 10, 2014

(51) Int. Cl.
*H04M 3/22* (2006.01)
*H04M 3/30* (2006.01)
(Continued)

(52) U.S. Cl.
CPC ...... *H04L 41/0816* (2013.01); *H04L 12/2898* (2013.01); *H04L 41/083* (2013.01);
(Continued)

(58) Field of Classification Search
CPC .................................................. H04L 41/0816
(Continued)

(56) References Cited

U.S. PATENT DOCUMENTS 7,389,144 B1* 6/2008 Osorio et al. .................. 607/29
7,830,816 B1* 11/2010 Gonzalez et al. ............ 370/252
(Continued)

FOREIGN PATENT DOCUMENTS

WO  WO-2006120513     11/2006
WO  WO 2006120513 A1 * 11/2006

OTHER PUBLICATIONS

International Search Report and Written Opinion for International Patent Application No. PCT/US2010/062604, dated Dec. 1, 2011, 6 pages.
(Continued)

*Primary Examiner* — Peter G Solinsky
(74) *Attorney, Agent, or Firm* — North Weber & Baugh LLP

(57) ABSTRACT

Described are systems and methods for a Digital Subscriber Line (DSL) customer premises equipment (CPE) Management Center (CMC). In one embodiment, the CMC includes a communications interface to receive information from the CPE device regarding operation of the CPE device. The received information is analyzed and a command signal generation module generates a corresponding command signal for transmission to the at least one CPE device to modify the CPE device operation based on the analysis results in a manner which either enhances CPE device performance, for example increasing data rate, or improves line stability, for example reducing CPE error rate.

26 Claims, 7 Drawing Sheets

(51) Int. Cl.
  *H04L 12/24* (2006.01)
  *H04L 12/28* (2006.01)
  *H04M 11/06* (2006.01)
(52) U.S. Cl.
  CPC .......... *H04L 41/14* (2013.01); *H04M 3/2227* (2013.01); *H04M 3/304* (2013.01); *H04M 11/062* (2013.01)
(58) Field of Classification Search
  USPC ........................................................ 370/254
  See application file for complete search history.

(56) References Cited

U.S. PATENT DOCUMENTS

| | | | |
|---|---|---|---|
| 8,498,294 B1* | 7/2013 | Monk et al. | 370/392 |
| 2005/0123027 A1* | 6/2005 | Cioffi | H04B 3/32 375/222 |
| 2006/0280235 A1* | 12/2006 | Rhee et al. | 375/222 |
| 2007/0036340 A1* | 2/2007 | Rhee et al. | 379/399.01 |
| 2008/0205501 A1* | 8/2008 | Cioffi | H04L 41/0803 375/224 |
| 2008/0219290 A1* | 9/2008 | Cioffi | H04L 5/1438 370/465 |
| 2008/0298444 A1* | 12/2008 | Cioffi | H04L 41/0823 375/222 |
| 2009/0028170 A1* | 1/2009 | Jiang et al. | 370/406 |
| 2011/0041176 A1* | 2/2011 | Maria | 726/13 |

OTHER PUBLICATIONS

International Preliminary Report on Patentability for International Patent Application No. PCT/US2010/062604, dated Jul. 11, 2013, 9 pages.
Office Action dated Dec. 5, 2016, in European Patent Application No. 108013616 (3pgs).

* cited by examiner

MANAGEMENT CENTER FOR COMMUNICATION SYSTEM CUSTOMER PREMISES EQUIPMENT

CLAIM OF PRIORITY

This application is a U.S. National Phase application under 35 U.S.C. § 371 of International Application No. PCT/US2010/62604, filed Dec. 30, 2010, entitled "MANAGEMENT CENTER FOR COMMUNICATION SYSTEM CUSTOMER PREMISES EQUIPMENT" the entire contents of which are incorporated herein by reference.

TECHNICAL FIELD

The subject matter described herein relates generally to the field of communications systems, and in particular, a method and apparatus to manage customer premise equipment (CPE).

BACKGROUND

Many end user consumers including residential consumers and business consumers connect to the Internet by way of Digital Subscriber Line (DSL) technologies. With DSL technologies, a service provider provides an end user, or "customer" with access to a Broadband network via a twisted pair telephone line, referred to herein simply as a "line." The use of such lines to deliver Broadband network content to an end user is beneficial because they have already been implemented throughout much of the world, and thus, Broadband network access requires minimal infrastructure build out between an end user's location and the Broadband network interface.

Because the number of lines may be very great, lines service provides typically attempt to provision lines so that a certain minimal level of line performance and stability is achieved in a manner which will require little, if any, further consideration by the provider. Even where a provider might implement a more active line management program, a lack of insight into a each end user's experiences and demands coupled with the expense of needing to maintain a great number of lines may still result in a "set it to forget it" mentality on the part of a line provider or wholesaler which may ultimately dissatisfy an end user either with respect to perceived quality of service (QOS), etc.

Also, in some locations, a DSL services wholesaler provides DSL communication equipment to form an infrastructure for such services and DSL services resellers sell DSL services (e.g., "Internet access") delivered over that infrastructure to individual end users. Because the DSL services wholesaler controls the equipment forming the DSL infrastructure and the DSL services reseller maintains a services relationship with the consumers, conflicts exist between a DSL services wholesaler most interested in protecting the integrity of the infrastructure and a DSL services reseller desiring access and control of the equipment for the sake of managing service quality to their end users.

Whether the services are provided to the end customers by the wholesaler or a reseller service provider, the services to the end customers are typically monitored and configured by the DSL service providers management systems, which are in general operated by the wholesaler, and are located in the wholesaler's network (central office (CO), NMS, etc.). Any information from the end customer's equipment is therefore typically collected via the service provider equipment at the CO side, such as DSLAMs (DSL Access Multiplexers), network traffic routers, and gateways.

Furthermore, instructions, control and monitoring messages for controlling, collecting information, and configuring the end user/customer devices on the customer end, are also provided via equipment at the CO side. Such instructions and messages are communicated over information and communication channels provided between the customer side devices, and the service provider equipment. The customer side devices are also known as Customer Premises Equipment (CPE), and devices. An example of these communications channels are TR-69, Internet protocol (IP), Embedded Operational Channel (EOC), SNMP.

There are many instances, where certain information is not provided from the customer side to the service provider side. For example, there is limited bandwidth provided for the control communication channels between the customer devices and the service provider equipment, therefore limited information is exchanged between the customer devices and the service provider equipment. Furthermore, the customer devices are exposed to impairments on the CPE side, such as noise, interference (radio interference, impulse noise) etc., which may not be readily deduced from the service provider side. As another example, where an ILEC (Incumbent Local Exchange Carrier) operating a central office (CO) might implement line management at the CO side of the Line, a CLEC (Competitive Local Exchange Carrier) may assume the role of a third party with respect to line management via the CPE side, particularly where the CLEC leases line capacity and may lack any access to the central office (CO) side.

There could also be limitations on the CO side for provisioning or configuring the DSL system. For example, there are limitations with respect to how information and settings are managed by certain types of DSLAMs. For example, the range of parameter settings within certain types of DSLAMs may not comply with established industry specifications, or the DSLAM Management Information Base (MIB) or certain parameters within the MIB might not be accessible. In other instances, the DSLAM MIB might not allow the range of certain parameters to be changed. These limitations would prevent provisioning, improving or optimizing the performance of DSL connections.

The present state of the art may benefit from embodiments of the present invention by providing an interface to the lines through which line performance may be enhanced and/or line problems diagnosed.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
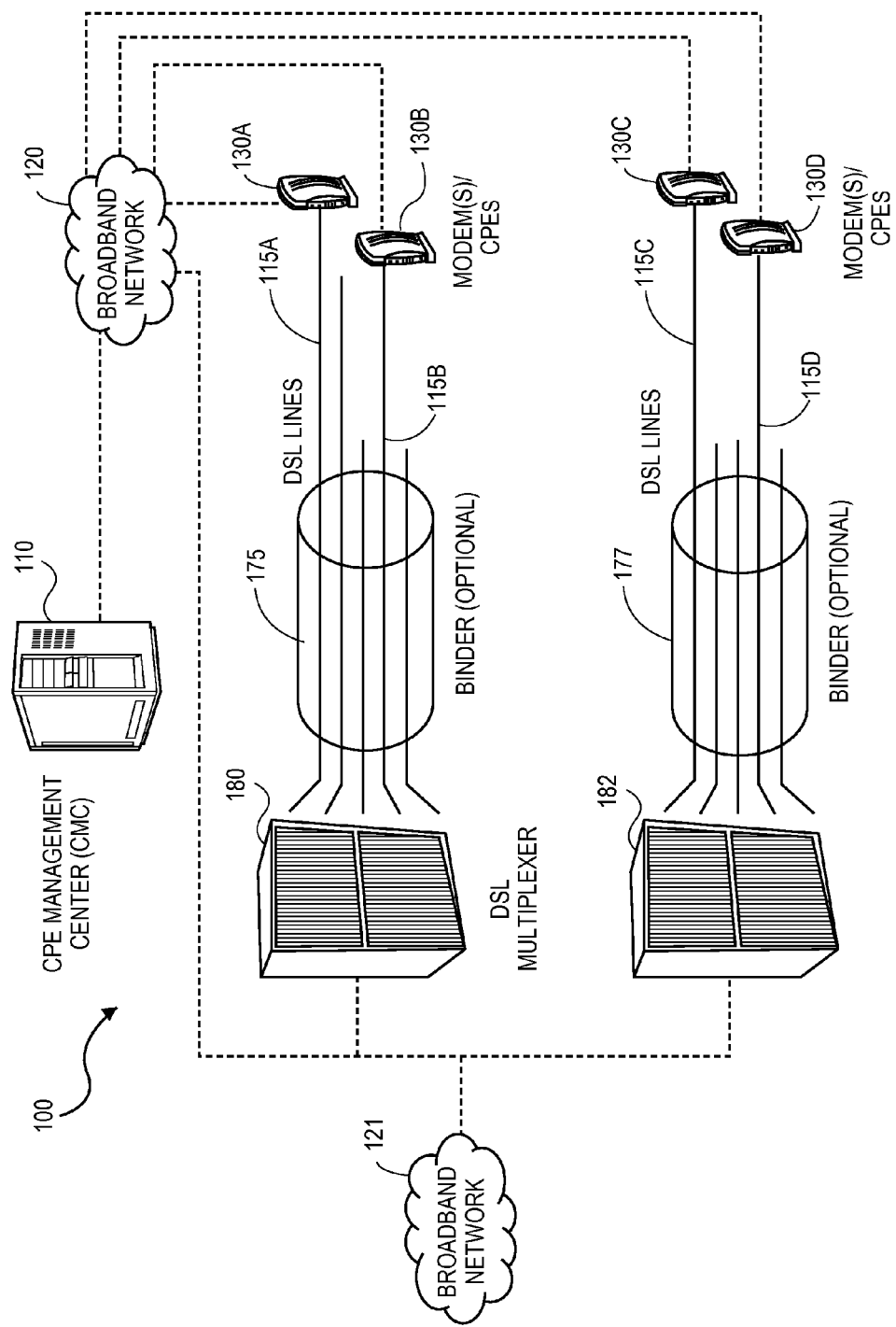
FIG. 1 illustrates an exemplary system in which embodiments of a customer premises equipment (CPE) Management Center may operate.

Described herein is a DSL customer premises equipment (CPE) Management Center (CMC) and methods for implementing and operating a CMC. Generally, a CMC manages lines via the CPE side of a Line in an "end user-centric" manner. The CMC is to provide a means for Line management either directly to an end user of a CPE or to third party serving a plurality of end users as part of a consumer market. For example, where an ILEC (Incumbent Local Exchange Carrier) operating a central office (CO), might implement line management at the CO side of the Line, a CLEC (Competitive Local Exchange Carrier) may assume the role of this third party with respect to line management via the CPE side, particularly where the CLEC leases line capacity and may lack any access to the central office (CO) side. In such an embodiment, the CMC provides the CLEC an interface to the lines through which line performance may be enhanced and/or line problems diagnosed even where the management interface of a Digital Subscriber Line Access Multiplier (DSLAM) for various lines is not directly accessible. In other instances, an end user might contract line management services with the third party separately from the DSL provider.

In embodiments, the CMC management functions include: 1) collecting operational data characterizing CPE device operation on a particular line, and 2) providing analysis/diagnostics of the line based on at least the collected operational data, and/or 3) automatically modifying CPE device operation, again based at least on the collected operational data, to enhance line performance. Examples of diagnostics include identifying line problems, such as wiring defects. Examples of enhancing line performance include increasing the data rate of the line or stabilizing the line (e.g., reducing error rates).

As used herein, the terms "end user," "subscriber," and/or "customer" are used interchangeably and all refer to a person, business and/or organization to which communication services and/or equipment are provided by any of a variety of service provider(s). Further, the term "customer premises" refers to the location to which communication services are being provided by a service provider. As an example when the Public Switched Telephone Network (PSTN) used to provide DSL services, customer premises are located at, near and/or are associated with the network termination (NT) side of the telephone lines. Exemplary customer premises include a residence or an office building.

The term "service provider" refers to any of a variety of entities that provide, sell, provision, troubleshoot and/or maintain communication services and/or communication equipment. Exemplary service providers include a telephone operating company, a cable operating company, a wireless operating company, an internet service provider delivering services over its own communications infrastructure or the communications infrastructure of a another party, or any third party that diagnoses or improve broadband communication (DSL, DSL services, cable, etc.) performance.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a system to perform the methods and operations which are described herein. In another embodiment, the instructions to perform such methods and operations are stored upon a non-transitory computer readable medium for later execution.

FIG. 1 illustrates architecture of an exemplary CMC system 100 in which embodiments may operate in compliance with the G.997.1 DSL management standard (also known as G.ploam), and one or more of the following DSL transmission standards: Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very high-bitrate Digital Subscriber Line (VDSL) standards, as well as the G.991.1 and G.991.2 Single-Pair High-speed Digital Subscriber Line (SHDSL) standards.

The CMC system 100 includes multiple CPE devices 130A, 130B, 130C, and 130D, each of which corresponds to an end user location such as a customer's residence or business. In one embodiment, each of the CPE devices 130A-D are DSL modems located within a customer's home or business to which the customer's home or business networked terminal devices are coupled. The CPE device could also be a broadband gateway, or a broadband modem, providing broadband connectivity to the customer premises.

As illustrated in FIG. 1, the CMC system 100 further includes an access aggregation device 180, 182 coupled to the CPE devices 130A-D via one or more twisted pair lines 115A-D (e.g., POTS telephone lines and the like). Multiple twisted pair lines 115 associated with different customer's remote DSL terminals may travel through or be co-located within binders 175, 177. FIG. 1 depicts the twisted pair lines 115A, 115B connecting CPE devices 130A and 130B as traversing the common binder 175 and twisted pair lines 115C, 115D connecting CPE devices 130C and 130D. One or more lines 115C, 115D could be connected to the same CPE. As an example, embodiments of the current invention include DSL bonding, and/or DSL vectoring, wherein multiple lines are connect to the same CPE device.

Each access aggregation device 180 and 182 has multiple physical ports to which the twisted pair lines 115A-D are connected. As depicted, CPE devices 130A, 130B connect with physical ports of access aggregation device 180 while CPE devices 130C, 130D connect with physical ports of access aggregation device 182. In one embodiment, each of the plurality of access aggregation devices 180, 182 are DSLAMs co-located at a physical CO location which may include other equipment operated by an ILEC, for example. Alternatively, the access aggregation device 180, 182 may be located remotely from each other and remotely from a CO location. Each access aggregation device 180, 182 is connected via a broadband link to a Broadband network, which is then in turn accessible to the various CPE devices 130A-D. The DSLAMs may connect to the broadband network 120 and/or a provider's private broadband network 121 in the operator's infrastructure, while the CMC connects to the CPE over the Internet via the broadband network 120.

The CMC system 100 further includes the CMC 110. In the exemplary embodiment depicted in FIG. 1, the CMC 110 is communicatively coupled to the CPE devices 130A-D over a wide area network (WAN). For WAN embodiments, the CMC 110 is coupled to the CPE device through the broadband network 120. In an alternate embodiment, the CMC 110 is connected to the CPE devices 130A-D directly or over a local area network (LAN) at the customer premises. As previously noted, CMC 110 may be operated by an independent entity for monitoring and controlling one or more CPE devices 130A-D as a controller, assisting end users of the CPE devices 130A-D. The CMC 110 may also be referred to as a Controller, Network Management Server (NMS), Element Management Service (EMS), or the like with the understanding that the control is exerted over the CPE device. For certain embodiments, for example, control by the CMC 110 is independent of management on the CO-side of the line.

Figure 2:
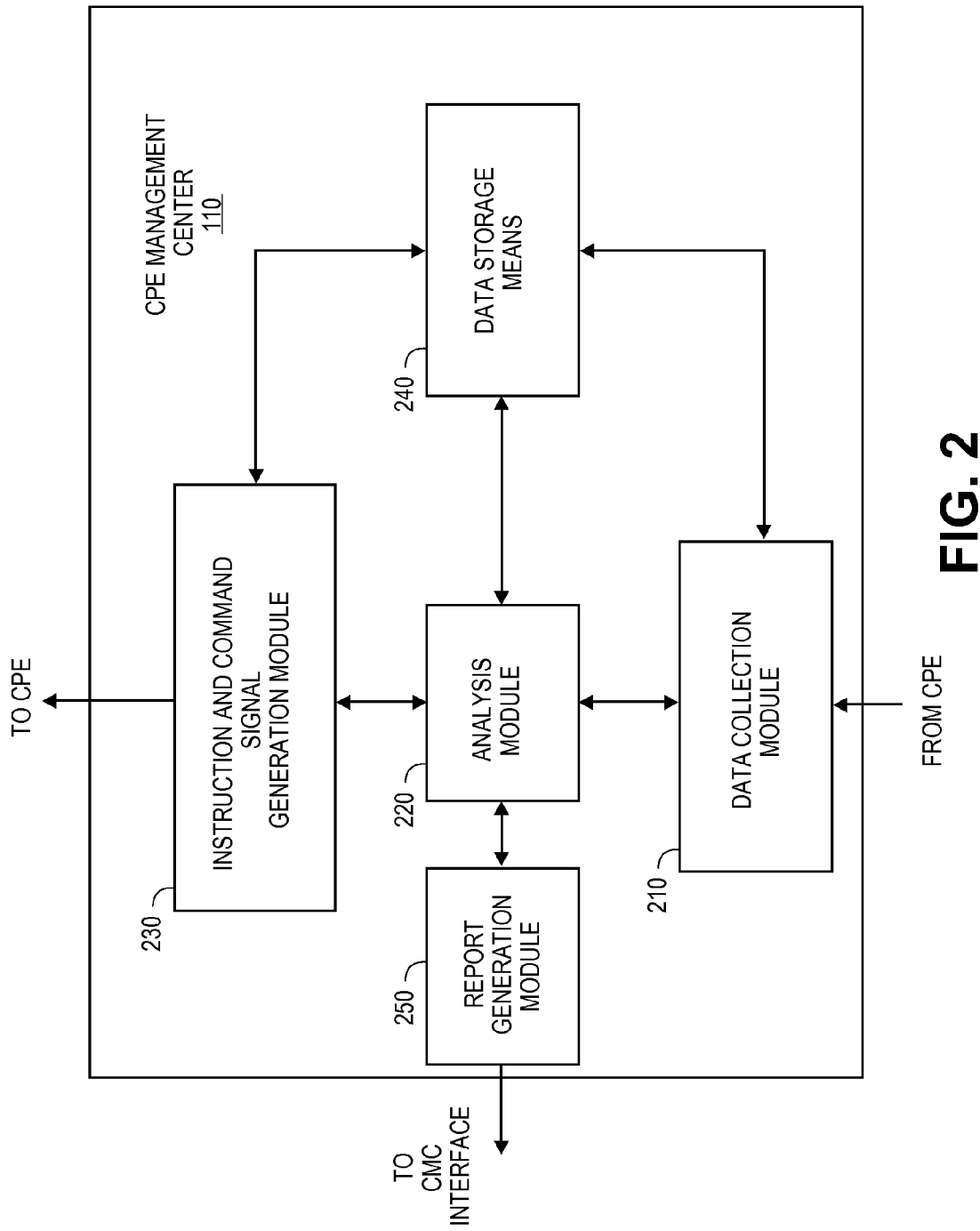
FIG. 2 illustrates exemplary functional modules of a CPE Management Center which embodiments may utilize.
Figure 3A:
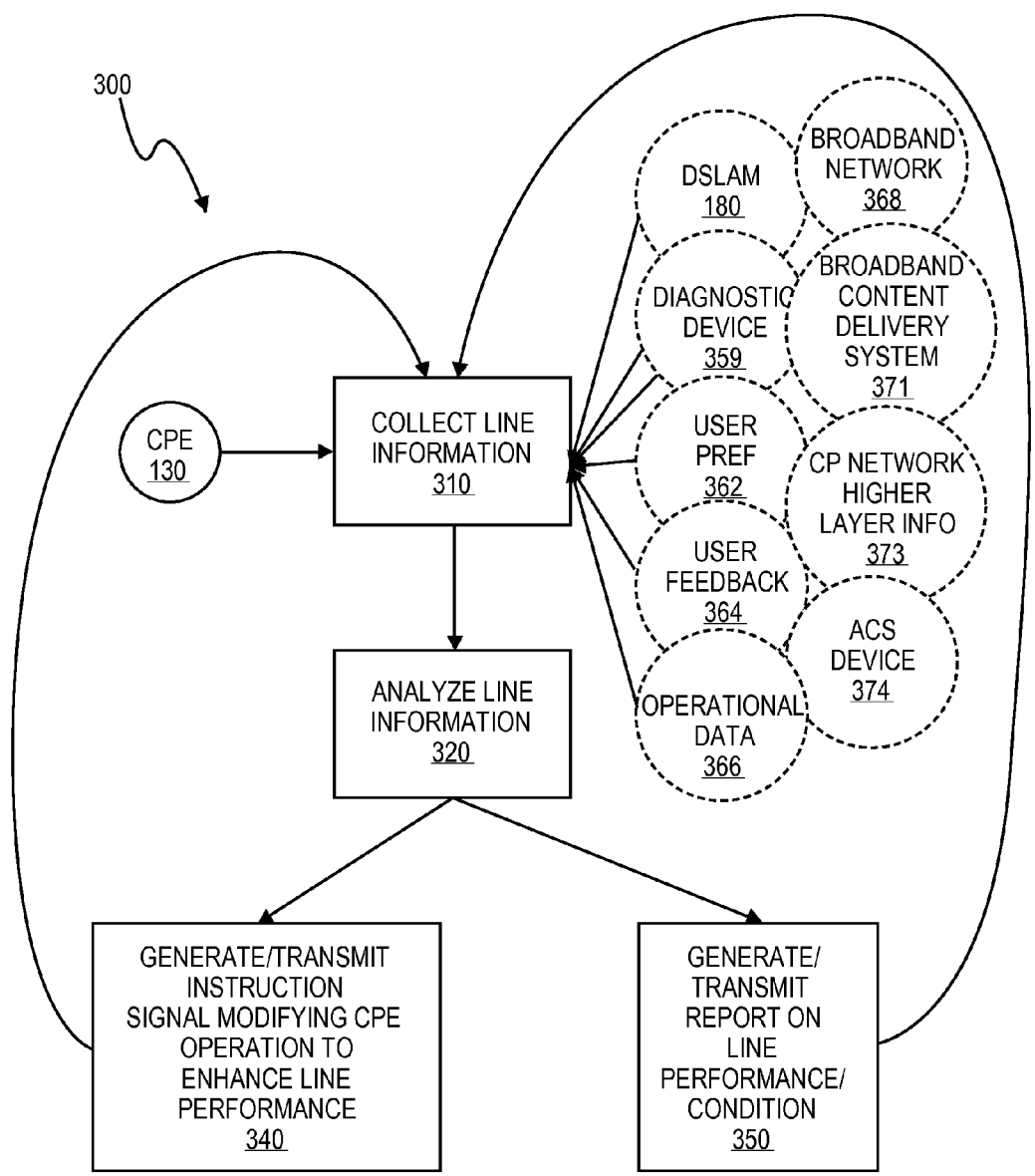
FIG. 3A is a flow diagram illustrating operation of a CPE Management Center in accordance with exemplary embodiments.

FIG. 2 depicts functional modules of the CMC 110, according to an embodiment of the invention. The CMC 110 includes a data collecting means such as the Data Collection module 210, an analyzing means, such as the Analysis module 220, and an instruction generating means, such as the Instruction and Command Generation module 230. These functional modules of the CMC 130 may or may not all be in the same location and/or provided by the same equipment, and may instead be distributed in different locations and separately accessed. Each module of the CMC 110 may be implemented by one or more servers each having one or more programmable processors executing code and accessing the Data Storage Means 240 comprising memory as well as other non-transitory storage media (e.g., hard drives and the like). FIG. 3A depicts a flow diagram of a CMC method 300 which is performed by the CMC 110, in accordance with an exemplary embodiment. Some of the blocks and/or operations listed in FIG. 3A are optional in accordance with certain embodiments. The numbering of the blocks presented is for the sake of clarity and is not intended to prescribe an order of operations in which the various blocks must occur.

CPE-Based Line Information Collection

CMC method 300 begins at operation 310 with the data collection module 210 collecting information from the CPE device 130 (e.g., CPE DEVICE 130A). The data collection module 210 is to collect such data on a periodic basis, on-demand, in real-time or on any non-periodic basis. Whether the CMC 110 is communicatively coupled to the CPE device 130 through the broadband network 120 (e.g., for example the Internet) or is operating and connected locally on a CPE terminal or connected over the provider's network 121, the data collection module 210 is operable to receive information regarding operation of the CPE device 130 from the CPE device 130 via one or more of: analog POTS, cellular data communications, wireless data communications, Broadband Forum TR-069, internet data communications (e.g., TCP/IP protocol or other means outside the normal internal data communication systems within a given DSL system), electronic mail communications such as SNMP, and a DSL communication channel such as the Operation, Administration, and Maintenance (OAM) and Embedded Operational Channel (EOC) specified by the G.997.1 or G.992.x standards for physical layer management for ADSL transmission systems.

As further illustrated in FIG. 3A, the data collection module 210 is operable to also collect information from optional sources demarked by dashed lines. In some embodiments, the additional points of information collection are at least exclusive of the CO-end of a line and may further be particular to collection points present on the CPE-side of the line only. However, in some embodiments, the CMC 110 does collect information from the access aggregation device coupled to the CPE device 130 (e.g., a DSLAM 180 for CPE device 130A). In such an embodiment, sufficient access to the CO is made available to the CMC 110 so that operational data for a line may be collected by the data collection module 210 in addition to the operational data collected from the CPE DEVICE 130 and other CPE-side collection points. In some such embodiments, the access to the CO is limited in that CMC 110 is afforded no control over the DSLAM operation.

Figure 4:
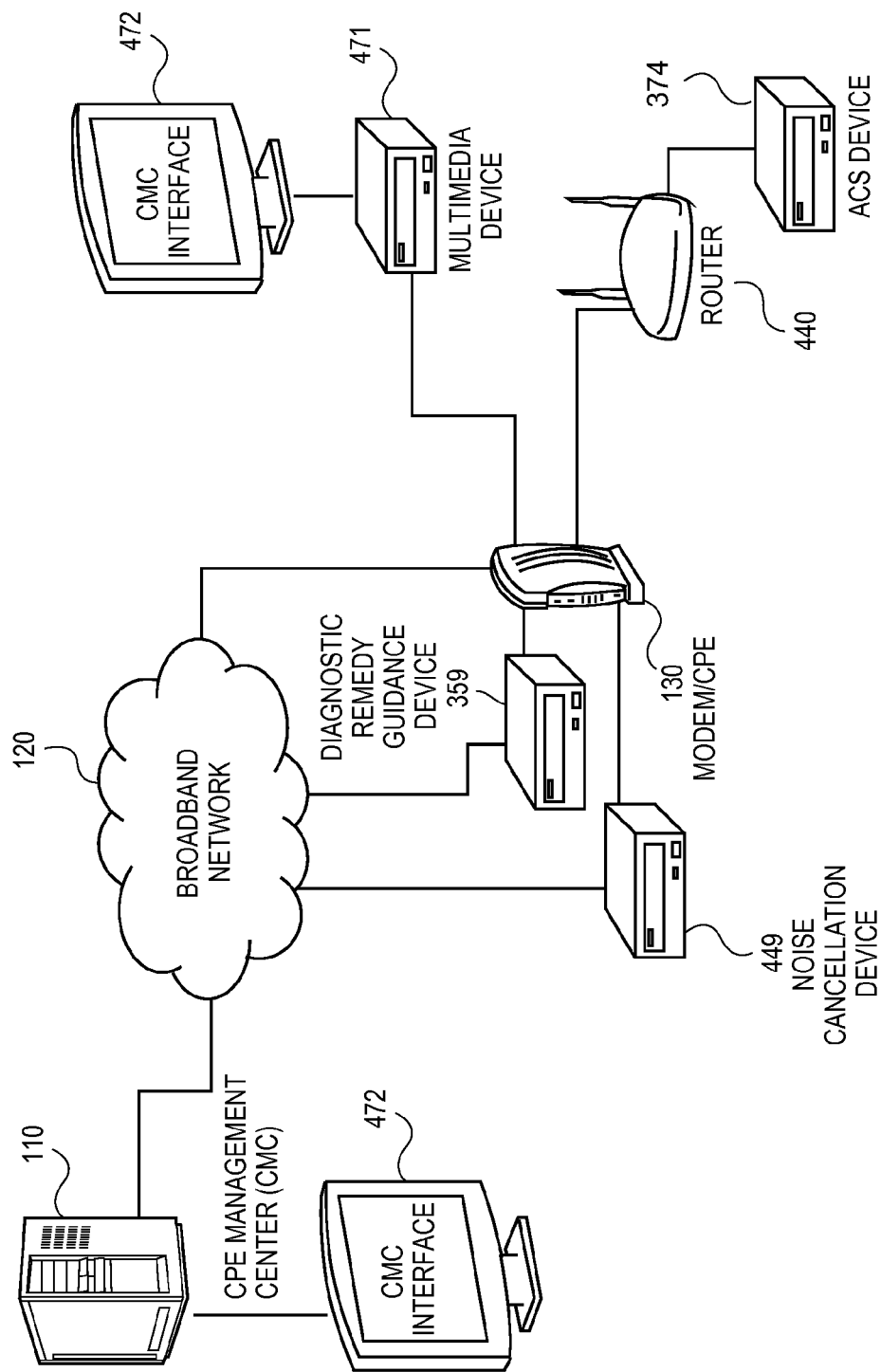
FIG. 4 illustrates an exemplary CPE network in which embodiments of a CPE Management Center may operate.

In an embodiment, the CMC 110 is coupled to a diagnostic and remedy guidance device 359 ("diagnostic device") present on the CPE end of the line. Referring to FIG. 4, which expands on the CMC system 100 by further illustrating CPE terminals coupled to the CPE device 130 (e.g. in a home network), the diagnostic and remedy guidance device 359 may be implemented as a set top box or integrated into another device (e.g., the CPE device 130 itself). In certain embodiments, the diagnostic and remedy guidance device 359 is operable to analyze a line performance (e.g., during showtime operation) for a predetermined operational performance signature indicative of a line condition and to provide guidance on mitigating such a condition. In other embodiments, the diagnostic and remedy guidance device 359 is operable to perform single ended line tests (SELT), for example while an end user is not utilizing the line for access to the broadband network 120. The SELT performed by the diagnostic and remedy guidance device 359 may be any conventionally performed line test (e.g., line reflectance measurements, etc.), but rather than requiring a truck roll and technician intervention, the diagnostic and remedy guidance device 359 is operable to perform the measurements autonomously. As shown in FIG. 3A, the data collection module 210 may access the diagnostic information determined by the diagnostic and remedy guidance device 359.

In an embodiment, the CMC 110 sources end user preferences from which the data collection module 210 acquires information provided by the end user of the CPE device 130. The user preferences may relate to, for example, desired data rates, quality of services for video, audio and data transmission, and time of day usage, and are typically tailored to the type of broadband network content being accessed via the CPE device 130 and/or the type of customer network coupled to the CPE DEVICE 130. The end user preference information may come from a database of user preferences 362 which aggregates user preference information entered by an end-user for each CPE device 130 being managed by the CMC 110, for example at the time a CMC account is established by an end user.

In an embodiment, the CMC 110 sources end user feedback 364 from which the data collection module 210 acquires information regarding an end user's contemporaneous experiences with the CPE device 130. For example, the data collection module 210 may access information provided by an end user of the CPE device 130 indicating that received content is pixilated, inadequately buffered, or the like. Depending on the embodiment, the end user feedback may be provided to the CMC 110 via an application device interface, such as the CMC user interface 472 further illustrated in FIG. 4.

Further referring to FIG. 4, in an embodiment, the CMC user interface 472 is coupled with the CMC 110 (i.e., hosted by the CMC 110 through the broadband network 120). In another embodiment, the CMC user interface 472 is hosted by the CPE device 130. For example, the CPE device 130 may include a web server which an end user may access to provide feedback real-time. For such an embodiment, the CMC 110 may be executing on the CPE device 130 itself or on CPE terminal device as a LAN embodiment of the CMC system 100. Alternatively, the CMC user interface 272 is supported by a noise cancellation or signal conditioning device, for example implemented as a set top box 449, separate from the CPE device 130. The noise cancellation device or signal conditioning device 449 may comprise a filter bank utilizing filter coefficients generated via any filtering techniques known in the art, such as, but not limited to, DSL vectoring, DFE, GDFE, and the like. In other embodiments, the diagnostic and remedy guidance device 359 previously described or an ACS device 374 supports an application providing the end user interface 472. Similarly, a controller or input device of the multimedia/computing device 471 may also provide the end user interface 472 through which an end user indicates an instantaneous problem.

In an embodiment, the CMC 110 is coupled to an operational database 366 from which the data collection module 210 acquires stored operational data that is generated as a result of a CPE device's performance in the DSL communication system. Such stored operational data may have been collected over a period of time at some sample rate that minimizes performance reductions (e.g., 15 second intervals minutes apart over different times of day, etc.). The stored operational data accessed by the CMC 110 may be for the target line being managed and/or at least one other non-target line to improve inferences regarding the target line. In one such embodiment, the CMC 110 accesses the operational database 366 to collect operational data for a non-target line contained within a binder common to the target line being managed. For example, where the CMC 110 is to manage the line 115A, operational data stored for lines 115A and 115B, etc. may be accessed from the operational database 366.

In an embodiment, the CMC 110 is coupled to a Broadband network information database 368 from which the data collection module 210 accesses information regarding the type and performance of the Broadband network 120. For example, a CMC operator may provide physical inventory of the Broadband network 120 including characterization of a Broadband link in the Broadband network (e.g., the DSL line 115), a history of the broadband communication link's characterization, a location of the link within the Broadband network, and use of the communication link.

As further depicted in FIG. 3A, the CMC 110 may be coupled to a Broadband network content delivery system 371, such as a set top box (e.g., multimedia/computing device 471 depicted in FIG. 4) from which the data collection module 210 may determine information about the performance demands placed on the line via the CPE DEVICE 130. In such embodiments, any of motion picture subscription service parameters, streaming video service parameters, internet television service parameters, music subscription service parameters, network gaming or entertainment service parameters, or Voice over Internet Protocol (VoIP) telephony service parameters, may be collected.

In further embodiments, the CMC 110 sources a customer premises network higher-layer protocol information database 373 from which the data collection module 210 receives information such as, but not limited to, packet loss and TCP/IP network information. The network higher-layer protocol information database 373 may contain such information for each of the lines to be managed by the CMC 110. The CMC 110 may additionally source the ACS device 374 to access information relating to the customer premises network and/or usage of the line via the CPE device 130.

CPE-Based Line Analysis

Returning to FIG. 2, the CMC 110 includes an analyzing means, such as the analysis module 220 which is communicatively connected to the data collection module 220. As illustrated in FIG. 3A, at operation 320, the analysis module 220 is to analyze the information received by the data collection module 210. Analysis of that information may be performed real time as information is received by the collection module 220, or may be performed periodically, or on demand, by accessing data collected by the data collection module 210 and stored in the data storage means 240. Analysis module 220 is to determine whether the instruction and command signal generation module 230 is to send instructions to one or more of the CPE devices 130 to enhance line performance and/or stability. The analysis module 220 is further to determine if the report generation module 250 is to issue a line diagnostics report conveying the analysis results to an end user and/or operator of the CMC 110.

In one embodiment, the analysis module 220 is to perform analysis at operation 320 based on collected information including one or more of: downstream attenuation, magnitude of channel response (H log) information, downstream bit, gain, and signal to noise ratio (SNR) table, quiet line noise table, impulse noise history, history of downstream code violations (CV) or upstream CV, history of downstream errored seconds (ES) or upstream ES, history of downstream forward error correction (FEC) or upstream FEC, history of retrains; history of bit swap or other real time adaptive features; history of fast retrains and/or SOS's, or line impedance. SOS relates to sudden and severe noise conditions, where a rapid rate adaptation (RRA) solution, known as SOS in the ITU-T standard, is a promising mitigation strategy to sustain the link and prevent the DSL modem to retrain. Since the CMC 110 is collecting data from potentially a plurality of sources, but at a minimum is collecting information from the CPE DEVICE 130, the line performance enhancement is CPE-centric.

Generally, line analysis may include line diagnostic functions performed at operation 320 including, without limitation: bad splice detection, bridged tap detection, impulse noise detection, split pair detection, identification or classification of noise and/or interference sources, Amateur Radio (HAM) detection, AM radio detection, HDSL detection, T1/E1 detection, high-power noise detection, unbalanced wiring detection, maximum data rate analysis, and forward error correction (FEC) analysis. Results of these diagnostics functions are optionally stored in the CMC storage means 240 for future or immediate reference.

Analysis of Line Quality & Stability

The analysis module 220 may employ a number of techniques with the information collected from the CPE-side of the line. For example, in one embodiment operation 320 entails analyzing line instability and/or quality based on the channel performance monitoring parameters and/or line performance monitoring parameters obtained from at least the CPE DEVICE 130. In a particular embodiment, line instability and/or quality is analyzed in method 300 based on parameter values obtained from the CPE-side of the line. For example, distributions of parameter values collected over time are evaluated. Both line instability and quality can be determined from evaluation of such distributions. For example, if the distribution for CV does not satisfy threshold conditions, then the line is declared unstable. As another example, if the distribution of FEC does not satisfy threshold conditions, then the line is declared of poor quality. Thresholding expressions may also be constructed using combinations of rules with multiple parameters from the CPE-side. These expressions could depend on the vendor and/or system ID of the CPE device 130.

Information characterizing a line problem or failure may be recorded to the data storage means 240 (FIG. 2). For example, the time/day of line problems can be recorded to provide statistical information about the times and days when such events are most likely to happen. This can be achieved for example by recording the intervals when CV or some other channel/line performance monitoring parameter exceeds a certain threshold. A failure may also be recorded, for example, if the parameter falls below the threshold.

Any conditions derived from parameters such as the above may also incorporate performance parameters such as data rate, maximum attainable bit rate (MABR) and margin. For example if MABR is used as the performance parameter for a specific line, collected MABR data for that line is compared to a neighborhood average for the given loop length. If the MABR data rates are lower than the average of those for neighboring lines by a predetermined margin, then the line is considered likely of being unstable. The average neighborhood MABR is obtained by: collecting MABR data in the neighborhood network of a line, taking the average or other statistical function of the MABR for lines which have similar loop lengths. This data can also be updated over time. The network neighborhood average shows the expected MABR for all the lines in a specific neighborhood, and if a line MABR drops below that average, it could be an indication of a line problem. Examples of the other statistical functions, besides the mean, could include "median" or "X percentage worst case value" being the MABR for which X percentage of the lines have lower MABR.

Analysis of Noise Type

In a further embodiment, the analysis module 220 is to identify a type of noise in the line based on the information received from the CPE device 130. For example, where stability or quality is determined to be poor, then a further decision is made as to the type of noise/disturbance that is causing the poor line stability. The type of noise/disturbance may be compared to the noise at the CPE device 130 before a line failure and after a line failure including a so-called "'SOS event" or an SRA event, where the modem in the DSL receiver remains operational, but reduces its data rate. SOS relates to sudden and severe noise conditions, where a rapid rate adaptation (RRA) solution, known as SOS in the ITU-T standard, is a promising mitigation strategy to sustain the link and prevent the DSL modem to retrain. SRA (Seamless Rate Adaptation) relates to slow to moderately varying noise cases, where rates are adaptively reduced. A significant difference between the measured noises indicates that the line failure occurred because of a substantial increase of the noise level. Comparable noise levels before and after the line failure indicate that causes other than an increase in the noise lead to the line failure. Notably, a major advantage of the CPE-centric management systems and methods described herein relates to noise analysis/mitigation because the CO-side (e.g., DSLAM) does not necessarily experience the same noise as the end user. For example, duration, timing, periodicity of noise, and characterization of noise is often particular to the end of the line from which it is measured.

A CPE-side noise measurement before the line failure is preferably made at least a few seconds before the line failure occurs. The noise measurement after the line failure should be made after the line has reinitialized (or after the SOS or SRA procedure to reduce data rate has concluded) and is in stable condition (e.g. signal to noise ratio (SNR) margin is stable, CV count is Low, etc.). Other embodiments may utilize any other of the many techniques known for evaluating the noise via the CPE-side of the line. In one embodiment, for example, the CPE device 130 reports the mean-square-error (MSE) of its decoder. Such error may correspond to a slicer's output, a trellis decoder's output, or a RS decoder output.

If it is found that the noise before and after the line failure is not significantly different, then it is determined that the line failure may be the result of a power loss, or the result of a severe impulse noise event (for example, a voltage surge on the line). In order to differentiate between power loss and impulse noise event, some additional checks can be performed. For example, a check if line failure is correlated with a loss-of-power (LPR) failure reported by CPE device, a check if the CPE device is powered by a computer such as via a USB connection to the multimedia/computing device 471, a check if neighboring lines experience failures at the same or similar times indicating a sever impulse noise event, a check if CPE device 130 is in saturation, there's an increase of received signal power, activation of circuit protection logic, overflow bits or similar activated indications. If such exist, then it is likely a severe impulse noise event has occurred. Otherwise, stationary noise is declared. For either power loss or impulse noise events, the information characterizing the line failure can be recorded, for example, the time/day of the failure can be recorded to provide statistical information about the times, days when such events are most likely to happen.

In an embodiment, an impulse noise event duration is estimated by using channel or line performance monitoring parameters and recording the length of time over which these parameters exceed a certain threshold. The impulse noise width and period may also be estimated, if the intervals for measuring performance monitoring parameters are made short enough to be in the order of microseconds. Even if such short intervals are not possible, the repetitive impulse noise can still be approximately characterized based on the collected parameter values. For example, repetitive impulse noise may be characterized as level 1, if CV exceeds a first threshold for a first percentage of intervals, or may be characterized as level 2, if CV exceeds a second threshold for a second percentage of intervals.

The collected data in the various embodiments of the current invention, and used in the analysis embodiments include one of more of the following data, sources of information, and collected operational parameters: data rate data; Signal-to-Noise Ratio ("SNR") margin data; maximum attainable data rate data; aggregate transmitted power data; code violation count data; forward error corrections data; errored seconds data; errored minutes data; retrain counts data; channel attenuation data; noise power spectral density data; crosstalk coupling data; far-end crosstalk coupling data; near-end crosstalk coupling data; echo transfer function data; and data pertaining to crosstalk between the DSL modem pair and a second DSL modem pair operating on a neighboring DSL line.

The collected data in the various embodiments of the current invention, and used in the analysis embodiments, may further include one of more of the following: any stored list of events including DSL physical layer anomalies, defects and faults together with the event time stamps that has led to SOS activation; SOS activation times, durations and average data rate loss; any stored list of events including DSL physical layer anomalies, defects and faults together with the event time stamps that has led to a fast retrain, a failed retrain or a full retrain; INM (Impulse noise monitoring) histograms and impulse noise statistics; echo transfer function or un-cancelled echo PSD; retransmission statistics including the number of retransmitted blocks, number of successfully retransmitted blocks; total number of blocks; average, minimum and maximum throughput.

Diagnosis of Line Conditions

In embodiments, line conditions, such as problems like wiring defects, causing line instability or poor quality are diagnosed at operation 320 by analysis of information collected by the CMC 110 over time. Since the CMC 110 is collecting data from potentially a plurality of sources, but at a minimum is collecting information from the CPE DEVICE 130, the line wiring diagnostics are CPE-centric.

Generally, at operation 320, the analysis module 220 may employ one or more techniques to detect line problems with the information collected from the CPE-side of the line. Because the embodiments described herein use the information collected from the line, for example, during showtime, line wiring conditions/defects may identified without disruption to the end user's DSL service.

In one embodiment, at operation 320 line performance metrics are generated, based on the received information, and then evaluated against a predetermined condition indicative of a line problem, such as a wiring defect. There are many known types of wiring defects in DSL systems. For example in some countries the in-house DSL wiring often includes a redundant third wire that was used for ringing a telephone bell several decades ago. The third-wire is not used any more, but the existence of such third wire in DSL systems creates an unbalanced impedance. Often, a parameter such as the bit distribution of a DSL line with a line problem, such as a wiring defect, may have abrupt changes and therefore it is possible to differentiate a line with a wiring defect from a typical line by quantifying the variations across frequency bins (tones), and comparing against predetermined thresholds. Generally, when a metric passes the threshold, whether exceeding or falling below the threshold, the line parameter may be considered to have rapid variations.

A reference database accessible to the analysis module 220 (e.g., provided by storage means 240) may include a plurality of a line problems (e.g., wiring defects), each line problem associated with one or more reference metrics. At operation 320, reference information is compared the one or more performance metrics derived from the CPE information to identify the line problem, such as a wiring defect. These performance metrics may be the average sum of changes in the parameter values across all or preselected number of tones. The performance metrics may also be the number of tones over which the parameter has changed. Alternatively, the performance metric could also be the sum of absolute values of changes, or their power, across all or preselected number of tones.

In another embodiment, the performance metric is average noise change in the DSL signal. Quiet-Line-Noise (QLN) or Mean Square Error (MSE) per tone may also be utilized, or the noise may be estimated indirectly from SNR, HLOG and PSD. For example, $MSE(n)=PSD(n)+H \log(n)-SNR(n)$, where n is the frequency tone index. QLN is the measured noise when the modem is neither active nor training. However, the noise may change significantly with time. This noise at later times during operation is referred to herein as MSE noise (Mean-Square-Error noise) or MSE function.

The above metrics can be applied to other DSL line parameters (such as bit distribution, H log (Hlin), SNR and measured noise). H log (Hlin) and SNR per tone samples are already reported parameters similar to the bit distribution, which then could be used in the analysis. The calculated detection metrics are compared against a pre-chosen threshold.

If any of the metrics are above (or in some embodiments below) their corresponding threshold, the line is considered to have a wiring defect. In another embodiment, a combination, for example a Boolean or logical combination of the values of the above metrics are compared against a single threshold.

Instruction and Command Signal Generation

As further illustrated in FIG. 3A, following the analysis operation 320, a command or instruction signal is sent from the CMC 110 to the CPE device 130 at operation 340, to modify the CPE device operation, and/or a report of the analysis is issued at operation 350. As denoted by the return arrow between operation 340 and operation 310, command signal generation may dynamically modify the CPE device operation in response to changes in the received information.

In an embodiment, the command or instruction signals are communicated over information and communication channels provided between the CPE devices, and the CMC 110. An example of these communications channels are TR-69, Internet protocol (IP), Embedded Operational Channel (EOC), and SNMP.

The signal generation operation 340 is performed by the instruction and command signal generation module 230 (FIG. 2). The instruction and command signal generation module 230 is configured to accept a parameter value generated by the analysis module 220 and, at operation 340, generate a signal for use by the CPE device 130 to modify its operation so as to enhance line performance, improve stability, or reduce errors in the modem. The instruction and command signal generation module 230 may or may not be part of the analysis module 220 and/or be implemented in the same hardware, such as a computer system. Instruction and command signal generation module 230 constitutes a means for regulating one or more parameter values in the CPE device 130.

In a particular embodiment, the nature of the analysis results dictates whether a report is issued (e.g., by report generation module 250), the CPE device operation modified via instructions issued to the CPE (e.g., by instruction and command signal generation module 230), or both. For example, diagnosis of certain line problems may result in no generation of an instruction command or signal at operation 340. If the results of the analysis indicated that there is no need to make any changes to the CPE configuration or settings then no command or signal is generated.

Where an instruction and command signal is issued to the CPE device 130 at operation 340, the signal may include, without limitation: a minimum INP override instruction; a target INP change instruction; a Maximum delay override instruction; a target delay change instruction; a channel initialization policy override instruction; an instruction to turn off specific downstream tones; an instruction to change transmit power over specific downstream tones; an instruction to force a CPE initiated re-training at a scheduled time; an instruction to Lower the maxR (representing the maximum rate); an instruction to change maximum data rate; or an instruction to change target margin. For example, one or more of the following physical layer parameters, could be set by the instruction and command signal: a Maximum Nominal Power Spectral Density ("MAXNOMPSD"); a Maximum Nominal Aggregate Transmitted Power ("MAXNOMATP"); a Gain ("gi"); a Bit loading ("bi"); a Power-Cut-Back ("PCB"); a Maximum Received Power ("MAXRXPWR"); a Power Spectral Density Mask ("PSD-MASK"); a Preferred Band ("PREFBAND"); a Target Signal-to-Noise Ratio Margin ("TARSNRM"); a Minimum Signal-to-Noise Ratio Margin ("MINSNRM"); a Maximum Signal-to-Noise Ratio Margin ("MAXSNRM"); a frequency-dependent Bit-Cap ("BCAP"); a frequency-dependent Target Signal-to-Noise Ratio Margin ("TSNRM"); a Transmit Spectrum Shaping ("TSSi"); a specification of bands affected by radio frequency interference; a Carrier Mask ("CARMASK"); a per band preference band indication; a per tone bit cap; a per tone TARSNRM; a minimum data rate; and a maximum data rate.

In an embodiment, the command signal issued to the CPE device 130 at operation 340 modifies the CPE device operation within a channel or line parameter value guard band established by the CO. For example, where a CO establishes a line profile, minimum or maximum values for a given channel or line parameter may also be established. In that case, the command signal issued to the CPE device 130 at operation 340 may modify the CO-established line profile, as constrained within the minimum and maximum values. As such, the CPE-centric management functions performed by the CMC 110 may be balanced with a CO operator's need to maintain some control over the infrastructure.

Figure 3B:
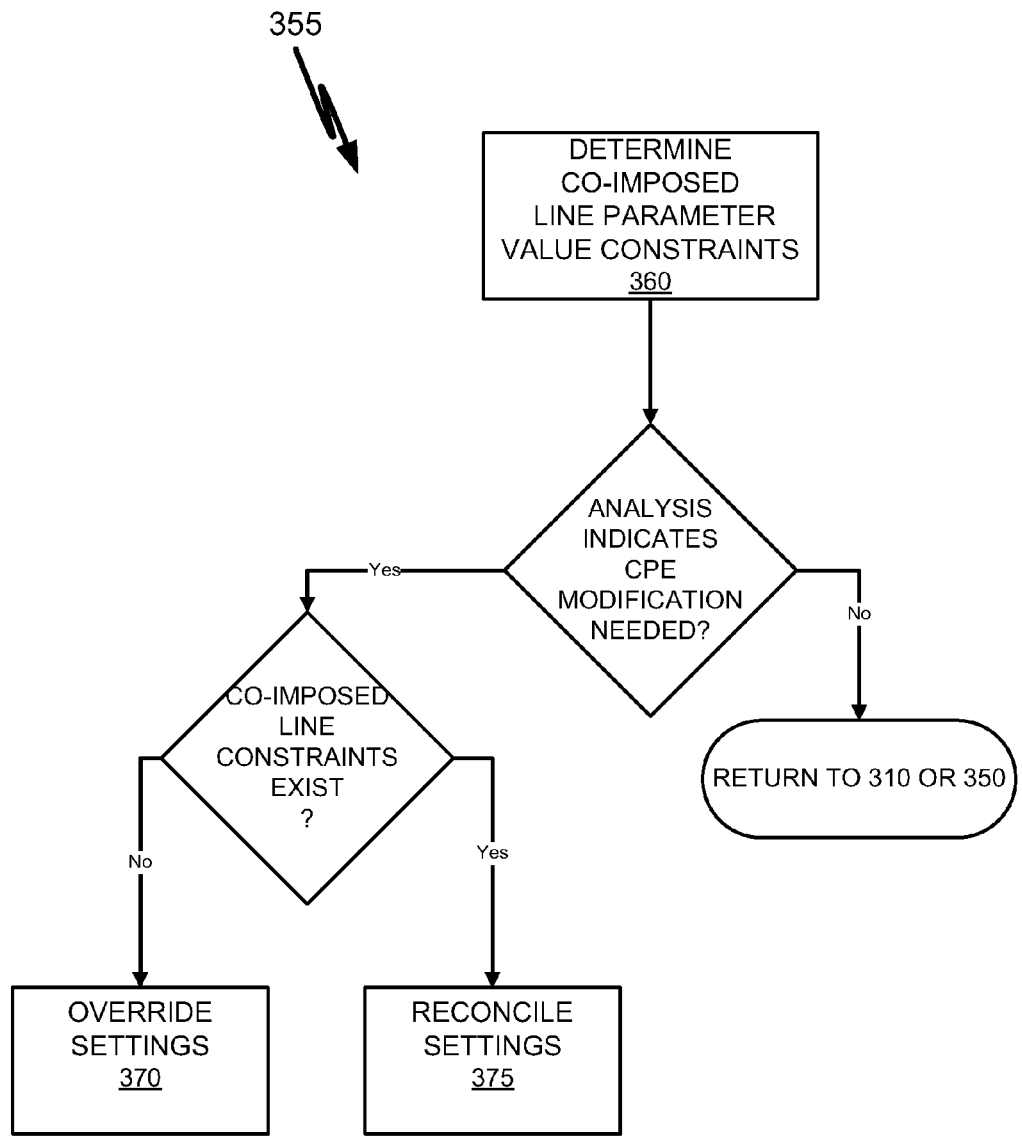
FIG. 3B is a flow diagram illustrating modification of CPE operation, in accordance with an exemplary embodiment.

FIG. 3B is a flow diagram illustrating CO-constrained modification of CPE operation, in accordance with an exemplary embodiment. Some of the blocks and/or operations listed in FIG. 3B are optional in accordance with certain embodiments. The numbering of the blocks presented is for the sake of clarity and is not intended to prescribe an order of operations in which the various blocks must occur. As shown in FIG. 3B, a CPE operation modification method 355 begins at operation 360 with the CMC 110 determining one or more line parameter values associated with a CO-imposed line constraint. Such parameters value constraints, may for example be included in data collected from the CO at operation 310 of FIG. 3A (e.g., pertaining to operational settings of the DSLAM 180).

In many instances, the range of values (minimum and/or maximum) for a given operational command or line parameter specified by the operator at the CO side may represent values which cause a non-optimum performance of the line or even in some cases cause instability. This is because operators typically assign the same line profile to all lines within their network. Operators prefer this simple approach, especially when dealing with hundreds of thousands of lines, further because segments of their network could also have been leased to resellers. However, each line could be experiencing different conditions and impairments. For example, in an environment with strong impulse noises, a very low margin setting for a line could cause the lines to become unstable. A proper setting in such cases would be to increase the minimum margin to a larger value. In yet other instances, the DSLAM MIB might not allow the range of certain parameters to be changed. These limitations would prevent provisioning, improving or optimizing the performance of DSL connections, when such limitations exist.

In such cases, at operation 370, the analysis module 220, determines to what extent one or more limits or range of line parameter values may be changed within the CO-imposed constraints. For example, the diagnostic and analysis techniques described elsewhere herein for the line analysis operation 320 may resolve a first set of line parameter values and at operation 370 that first set of line parameter values is limited by the CO-imposed constraints. Alternatively, a constrained optimization routine may be performed at operation 370 to incorporate predetermined CO-imposed constraints into the analysis operation 320 to arrive at one or more modified parameter values, limits, or range of values, in view of CO-imposed line constraints. If the results of the analysis indicated that there is no need to make any changes to the CPE configuration or settings then no command or signal is generated, and the method 360 returns to operations 310 or 350 to collect more data as part of ongoing line management and/or issues a report of the analysis cycle.

When the analysis results indicate that existing settings need to be overwritten, if there are no CO-imposed constraints instruction signals are generated for overriding the settings with the new values at operation 370. For example, the instruction generation means (e.g., module 230) overwrites, or otherwise changes the limits or the range of line parameter values by setting the parameter values or their limits on the CPE side, and on the CPE device. Where the instruction generation is further based on CO-constraints, the analysis may also trigger generation of instruction signal at operation 375 for reconciliation of the settings. For example a CO-imposed upper limit may be retained, while a lower limit is increased. An example would be for margin control, where an upper margin limit is kept the same, however the minimum margin is increased, to provide more protection against unexpected noise sources such as impulse noise. Such a setting could for example enable stabilizing the line, or improving the performance of the line when such a change is not possible on the CO side. In another example, one change at operation 375 includes limiting the range of parameters, within the existing range already pre-assigned on the line. In this example embodiment, the original range is set at the CO side, and the new range is being set at the CPE side, and the new range is not the same as the original range. The lower limit is higher than the existing minimum limit, and the upper limit is lower than the existing maximum limit. With limiting the range, the new range could assist with either improving the performance of the line or reducing or eliminating the instability of the line.

Standard parameter settings may also only have a lower limit or only a higher limit. For example, in standard implementations Impulse Noise Protection (INP) parameter is assigned a minimum INP (MIN INP), value but no maximum INP value. This lower value is normally set at the DSLAM by the line operator. In practice, modems would train to overcome impulse noise, and at times when hit by large impulse noise, the INP value is set to a very large value, which could impair the performance of the DSL connection. Since the DSLAM and the standards do not support an upper limit for INP, this impairment could not be overcome. Embodiments of present invention enable overwriting and setting the upper limit at the CPE side (e.g., at operation 370), by setting an upper limit for the INP. The override setting could be stored by the management center. The new range limits could be stored in the data storage means 240, or at the CPE if such a storage capability is available. The new limit would cap the maximum levels, therefore very large INP values would be avoided.

In addition to the examples provided above, one or more of the following DSL physical layer parameters controlling the operation of the DSL line, could similarly be set by the instruction generating means: SOS triggering controls including controls on SNR margin degradations, FEC, code violation (CV), ES, and SES counts, and probability of bit error. Fast retrain triggering controls including controls on duration of LOS and LOF anomalies, SNR margin degradations, FEC, code violation (CV), ES, and SES counts, and probability of bit error. Full retrain triggering controls including controls on duration LOS and LOF anomalies, SNR margin degradations, FEC, code violation (CV), ES, and SES counts, and probability of bit error. Retransmission controls including MIN and MAX INP for different types of impulse noises (e.g., Repetitive Electrical Impulse Noise (REIN) or Single Isolated Impulse Noise (SHINE)), MIN and MAX delay, FEC overhead ratio within a retransmission block, MAX throughout loss.

Command and control signals may be sent at operation 340 (or 370 and 375) to interfaces controlling the CPE device configuration and settings. Issued command or instruction signals are communicated over information and communication channels provided between the CPE device 130 and the CMC 110. An example of these communications channels are TR-69, Internet protocol (IP), Embedded Operational Channel (EOC), and SNMP. The CPE device 130 may be provided an interface similar to interfaces currently utilized on the CO side (e.g., those for controlling the settings and configurations via the DSLAM, such as the Q interface). The embodiments herein, such as the physical layer control parameters and the instructions of the examples above, define settings of a CPE interface which may be implemented in either a standardized or vendor-specific manner to directly change and control the configuration and settings of the CPE device 130.

In another embodiment, the CPE devices 130 do not belong to, are not owned by, or otherwise associated with, the same wholesaler or operator networks. For example, CPE devices 130 A-B, could belong to a first wholesaler or operator, and the CPE devices 130 C-D, could belong to a second wholesaler or operator. Similarly, the CPE devices 130 might not belong to the same reseller networks. Furthermore, the binders 175 and 177 could be the same binder and the DSL lines 115-A-D could all be passing through the same binder. Therefore, the CPE devices 130 A-B, and the CPE devices 130 C-D could be sharing the same binder. Lines which share the same binder could experience crosstalk from the other lines in the binder. The crosstalk could include Near-End crosstalk (NEXT) or Far-End crosstalk (FEXT). Furthermore, the lines sharing the same path could be exposed to similar sources of external interference, such as Radio Frequency (RF) interference. When the lines are operated by the same operator or Wholesaler, DSM (Dynamic Spectrum Management) techniques, such as those discussed in the DSM standards (such as the Dynamic Spectrum Management Technical Report (2007), ATIS-PP-0600007) could be used to optimize the performance of the DSL lines in the presence of crosstalk and interference, such as the aforementioned NEXT, FEXT, and RF interference. However, if the lines are operated by different operators, the DSM techniques could not be fully applied, since they are installed at the operator side, and require information from all lines (such as crosstalk information), whereas each operator would only have access to information and data pertaining to DSL lines within their own network, and won't have access to information from lines operated by another operator.

Embodiments of the present invention collect information and operational data and parameters from the CPE side. Although the CPEs may belong to different networks operated by different operators, in embodiments of the present invention, it is possible to collect information from the CPE side, store and process it in one common location, at the CPE Management Center CMC. The CMC would provide the means for collecting and analyzing information from the CPEs belonging to different operators, because the CMC is not tied to any of the networks of the multitude of operators. Furthermore, using the collection means in the data collection embodiments of the present invention, the CMC can collect information from the CPE devices independent of the particular network the DSL lines operate on and modify the various CPE devices to achieve performance goals.

Analysis Report Generation

At operation 350, analysis report is automatically compiled and issued by the report generation module 250 (FIG. 2) to either an end user of the CPE device 130 or to an operator of the CMC 110. The report may be issued via any of the means described in reference to modes of data collection. In one embodiment, the report is issued via a application interface supported by the CMC 110 (e.g., via CMC user interface 172). The application interface may be a graphical user interface (GUI) and/or a Northbound Application Programming Interface (NAPI) via which the performance enhancement or analysis results are accessible.

Report generation may occur in response to an event, such as, but not limited to identification of a line condition change or a passage of a predetermined amount of time since issuance of a previous report. In certain circumstances an analysis report may be issued in addition to a modification of the CPE device operation. In such a case, the analysis report may include a description of the modifications to the CPE device operation.

In the case for diagnosis of a line problem, the reporting function may for example report the presence of a wiring defect, or absence of a wiring defect if a test condition was not true. "Severity" of the problem may also be reported at operation 350. Similarly, any analysis result characterizing the line quality, line stability, line noise type as described herein may be output via an interface of the CMC 110.

Depending on the diagnosis, one or more corrective actions may be provided in the analysis report. For example, instructions to contact an ILEC to request removal of a bridged tap may be issued, or instructions to seek a contractor for removal of a third wire on the customer premises may be issued.

In embodiments where no operational instruction is issued to the CPE device 130, the CMC need only include a data collection module communicatively coupled to a CPE device, to receive information from the CPE device regarding CPE device operation, an analysis module coupled to the data collection module to analyze the received information for a predetermined operational performance signature indicative of a line problem, and a report generation module coupled to the analysis module to automatically compile or generate a report of the analysis results.

As previously described, the analysis module may obtain and evaluate channel performance monitoring parameters, line performance monitoring parameters, or distributions of the parameters over time, to analyze whether any line instability exists.

A diagnostics application interface may be further coupled to the analysis module to provide a predetermined set of corrective actions associated with the line problem.

Also as previously described, the information received from the CPE device may be operational data generated by the CPE device while in showtime and even where no command to change the CPE device operation is issued to the CPE device, the report generation module may issue the report to a DSL system operator or an end user of the CPE device in response to an event. Exemplary events include identification of a line condition change or a passage of a predetermined amount of time since issuance of a previous report.

In a particular embodiment, the analysis module is to analyze the received information by generating one or more performance metrics, based on the received information, and evaluate the one or metrics against the predetermined condition indicative of the line problem. As previously described, the one or more performance metrics may be any of: an average bit change across a plurality of tones in a DSL signal transmitted on the line, total bit change across a plurality of tones in the DSL signal transmitted on the line, a number of tones which experience at least two bits absolute change compared to a previous tone, average noise change in the DSL signal, wherein noise change is obtained from one of H log, Hlin, Signal-to-Noise Ratio (SNR), Quiet-Line-Noise (QLN), Mean Square Error (MSE) per tone, or a calculation based on one of SNR, H log, or Power Spectral Density (PSD).

Even where no command to change the CPE device operation is issued to the CPE device, the data collection module may nevertheless base analysis activities based on the information collected from a plurality of sources remote from the CPE device, including one or more of: a diagnostic device, a DSL multiplexer, an end user preference database, end user feedback, an end user-specified Broadband network information table, a Broadband network content delivery system, a home network protocol interface, or an ACS device.

CPE Device

Figure 5:
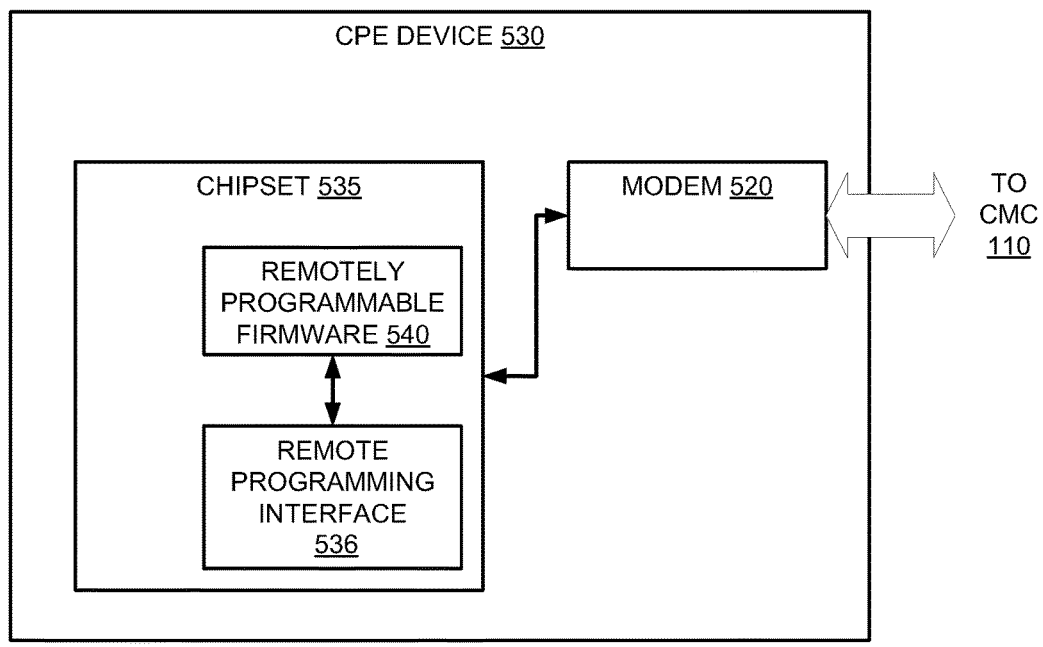
FIG. 5 illustrate exemplary components of a CPE which embodiments may utilize.

In certain embodiments described herein, the CPE DEVICE 130 includes provisions for communication with the CMC 110 (e.g., Data collection module 210 and Instruction and command signal generation module 230). An exemplary CPE DEVICE 530 depicted in FIG. 5, includes a chipset 535 supporting remotely programmable firmware 540 via a remote programming interface 536 through which the CMC 110 may access the CPE device 130 via the Transceiver Unit (TU)/modem 520. The CMC 110 may set the CPE device 530 to report the various operational data parameters described herein when generated by the CPE DEVICE 530 during showtime even if such parameters are not reported under existing standards. Similarly, the remotely programmable firmware 540 may support modification of the CPE device operation in response to receiving an instruction signal from the CMC 110. As such, any of the instruction signal commands issued at operation 340 may be implemented by the CPE device 530.

Figure 6:
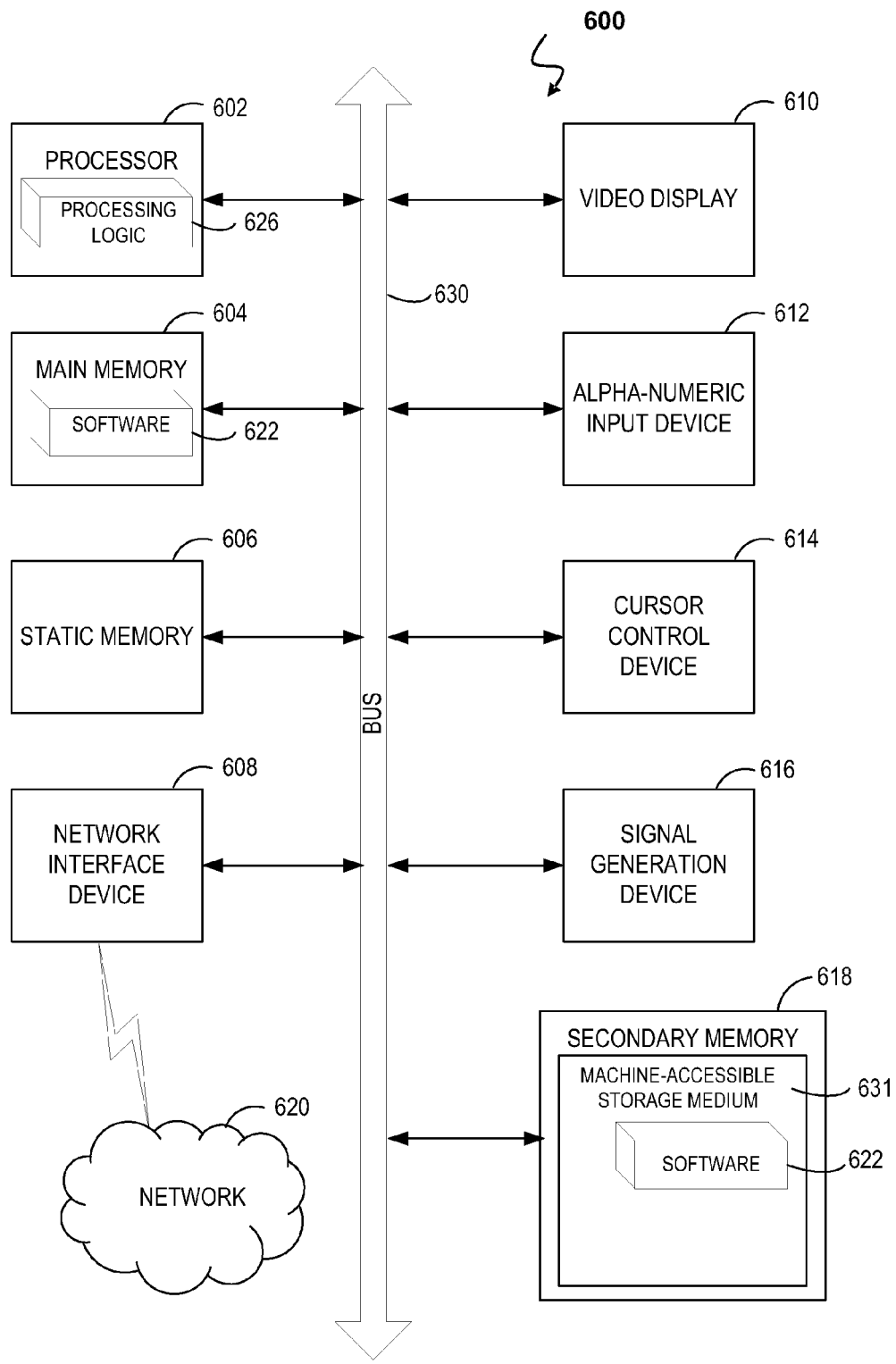
FIG. 6 illustrates a diagrammatic representation of a machine in the form of a computer system, in accordance with one embodiment.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing database storage services. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent data base implementations), which communicate with each other via a bus 630. Main memory 604 includes information and instructions and software program components necessary for performing and executing the functions with respect to the various embodiments of the CMC 110 described herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. Software 622 may also reside, or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. A Digital Subscriber Line (DSL) customer premises equipment (CPE) Management Center (CMC) coupled to a Broadband network, the CMC comprising:
   a data collection module, communicatively coupled to at least one DSL CPE device, to receive information from the CPE device regarding operation of the at least one DSL CPE device, wherein the information is to be received on a: periodic basis, on-demand basis, or in real-time basis;
   an analysis module coupled to the data collection module to analyze the received information, wherein the CMC is to determine one or more line parameter values associated with a central office imposed (CO-imposed) line constraint, and wherein the analysis module is to determine to what extent range of the one or more parameter values can be changed within the CO-imposed line constraints; and
   a command signal generation module coupled to the analysis module to receive analysis results and to generate a corresponding command signal for transmission to the at least one DSL CPE device to modify the at least one DSL CPE device operation within the CO-imposed line constraints based on the analysis, wherein the CMC is able to modify an operation of the at least one DSL CPE device independent of management on a CO side of the Broadband network, and wherein the CMC is capable to be afforded for collecting operational data without control over operation of a digital subscriber line access multiplexer (DSLAM) coupled to the at least one DSL CPE device.

2. The CMC of claim 1, wherein the data collection module is to gather information from a plurality of sources comprising one or more of:
   a DSL multiplexer,
   a diagnostic and remedy guidance device,
   an end user preference database,
   an end user customer feedback interface,
   an operational database, an end user Broadband network information database,
   a Broadband network content delivery system,
   a customer premises network higher-layer protocol information database, or
   an ACS device.

3. The CMC of claim 2, wherein the plurality of sources communicate with the CMC by way of one or more of the following:
   analog POTS,
   cellular data communications,
   wireless data communications,
   Broadband Forum T-069,
   IP protocol data communications,
   electronic mail communications, and
   a DSL communication channel selected from the group consisting of:
   Operation,
   Administration, and
   Maintenance (OAM) and Embedded Operational Channel (EOC).

4. The CMC of claim 1, further comprising an application device interface, through which end user feedback is provided, coupled with at least one of:
   the at least one DSL CPE device,
   a noise cancellation device,
   a signal conditioning device,
   a diagnostic and remedy guidance device,
   a controller or input device by which the user can indicate an instantaneous problem, or
   an ACS device.

5. The CMC of claim 1, wherein the data collection module is further to collect information defining line parameter constraints within which the at least one DSL CPE device is required to operate, wherein the analysis module is to analyze the received information to determine how to modify the at least one DSL CPE device within the line parameter constraints, and wherein the command signal generation module is to issue a command to the at least one DSL CPE device by changing line parameter values, limits, or a range of line parameter values within the line parameter constraints.

6. The CMC of claim 1, wherein the data collection module is communicatively coupled to a plurality of CPE devices, a first of the plurality associated with a first wholesaler or operator network and a second of the plurality associated with a second wholesaler or operator network, and wherein the command signal generation module is to modify operation of a CPE device of both the first and second wholesaler or operator networks.

7. The CMC of claim 1, wherein the CMC is to report modifications to the at least one DSL CPE device operation or analysis results concerning a line to a CMC operator or to an end user of the at least one DSL CPE device.

8. The CMC of claim 1, wherein the command signal is further based on information provided by the CMC operator and analyzed by the analysis module, wherein the information comprises:
- a physical inventory of the Broadband network including characterization of a Broadband link in the Broadband network,
- a history of the Broadband link's characterization, and
- a location and use of the Broadband link.

9. The CMC of claim 1, wherein the command signal is further based on information provided by an end user and analyzed by the analysis module, wherein said information comprises of:
- the end user's use and preference of Broadband network services and quality, including at least one of desired data rates, quality of services for video, audio and data transmission, and time of day usage preferences.

10. The CMC of claim 1, wherein the command signal is further based on information provided by a content delivery service, wherein said information comprises at least one of:
- motion picture subscription service parameters,
- streaming video service parameters,
- internet television service parameters,
- music subscription service parameters,
- network gaming or entertainment service parameters, or
- Voice over Internet Protocol (VoIP) telephony service parameters.

11. The CMC of claim 1, wherein the command signal generation module is to generate the command signal to dynamically modify the operation of the at least one DSL CPE device in response to changes in the received information.

12. The CMC of claim 1, wherein the received information comprises at least one of:
- Downstream attenuation;
- H log information;
- Downstream bit, gain, and SNR table;
- Quiet line noise table;
- Impulse noise history;
- History of CV, downstream or upstream;
- History of ES, downstream or upstream;
- History of FEC, downstream or upstream;
- History of retrains;
- History of bit swap or other real time adaptive features;
- History of fast retrains and/or SOS's;
- Impedance;
- DSL physical layer anomalies, defects and faults together with the event time stamps that has led to SOS activation, a fast retrain, a full retrain or a failed retrain;
- SOS activation times, durations and average data rate loss;
- INM (Impulse noise monitoring) histograms and impulse noise statistics;
- echo transfer function or un-cancelled echo PSD; or
- retransmission statistics.

13. The CMC of claim 12, wherein the analysis module is further to identify a type of noise in the line based on the received information.

14. The CMC of claim 1, wherein the command signal comprises at least one of:
- a minimum INP override instruction;
- a target INP change instruction;
- a Maximum delay override instruction;
- a target delay change instruction;
- a channel initialization policy override instruction;
- an instruction to turn off specific downstream tones;
- an instruction to change transmit power over specific downstream tones;
- an instruction to force a CPE initiated re-training at a scheduled time;
- an instruction to Lower the max;
- an instruction to change maximum data rate;
- an instruction to change target margin;
- SOS triggering controls including controls on SNR margin degradations, FEC, code violation (CV), ES, and SES counts, and probability of bit error;
- fast retrain triggering controls including controls on duration of LOS and LOF anomalies, SNR margin degradations, FEC, code violation (CV), ES, and SES counts, and probability of bit error;
- full retrain triggering controls including controls on duration LOS and LOF anomalies, SNR margin degradations, FEC, code violation (CV), ES, and SES counts, and probability of bit error; or
- retransmission controls including MIN and MAX INP for different types of impulse noises (REIN or SHINE), MIN and MAX delay, FEC overhead ratio within a retransmission block, and MAX throughout loss.

15. The CMC of claim 14, wherein command signal generation module is to modify the at least one DSL CPE device operation by changing limits or a range of line parameter values pre-assigned to the line at a CO side.

16. The CMC of claim 1, wherein the analysis module is to perform a constrained optimization routine to incorporate the CO-imposed constraints to determine at least one of: one or more modified parameter values, limits, or range of values in view of the CO-imposed constraints.

17. The CMC of claim 16, wherein the analysis module is to indicate whether there is a need to make any changes to a configuration of the at least one DSL CPE.

18. The CMC of claim 1, wherein the command signal generation module is to not generate a command signal for transmission to the at least one DSL CPE device in response to the analysis module indicating that there is no need to make any changes to the configuration of the at least one DSL CPE.

19. The CMC of claim 1, wherein the collection module is to collect more data when the command signal generation module does not generate the command signal for transmission.

20. A method of managing a digital subscriber line (DSL) customer premises equipment (CPE) device, the method comprising:
- collecting, at a data collection module of a management system located at a CPE-side of a broadband network and coupled to the CPE device, information from the CPE device regarding operation of the CPE device, wherein the data collection module is communicatively coupled to the DSL CPE device;
- analyzing, at an analysis module of the management system, the received information, wherein the information is to be received on a: periodic basis, on-demand basis, or in real-time basis;
- determining one or more line parameter values associated with a central office imposed (CO-imposed) line constraint, wherein the analysis module is to determine to what extent range of the one or more parameter values can be changed within the CO-imposed line constraints; and
- generating, at a command signal generation module of the management system, a command signal for transmission to the CPE device to modify the CPE device operation within the CO-imposed line constraints based on the analyzing, wherein the management system is able to modify the CPE device operation independent of management on a CO side of the broadband network, wherein the management system is capable to be afforded for collecting operational data without control over operation of a digital subscriber line access multiplexer (DSLAM) coupled to the at least one DSL CPE device.

21. The method of claim 20, wherein collecting the information further comprises gathering operation information from a plurality of sources, wherein the plurality of sources comprises one or more of:
a DSL multiplexer,
a diagnostic and remedy guidance device,
an end user preference database,
an end user customer feedback interface,
an operational database,
an end user Broadband network information database,
a Broadband network content delivery system,
a customer premises network higher-layer protocol information database, or
an ACS device.

22. The method of claim 20, further comprising:
collecting information defining line parameter constraints within which the CPE device is required to operate;
wherein analyzing the received information further comprises determining how to modify the CPE device within the line parameter constraints, and
wherein generating the command signal generation module further comprises issuing a command to the CPE device which changes line parameter values, limits, or a range of line parameter values within the line parameter constraints.

23. The method of claim 20, wherein collecting information from the CPE device further comprises collecting information from a plurality of CPE devices, a first of the plurality associated with a first wholesaler or operator network and a second of the plurality associated with a second wholesaler or operator network, and wherein generating a command signal for transmission modifies operation of a CPE device from both the first and the second wholesaler or operator networks.

24. The method of claim 20, wherein the command signal is to change limits or a range of line parameter values pre-assigned on the line at a CO side.

25. The method of claim 20, wherein the received information comprises at least one of:
Downstream attenuation;
H log information;
Downstream bit, gain, and SN table;
Quiet line noise table;
Impulse noise history;
History of CV, downstream or upstream;
History of ES, downstream or upstream;
History of FEC, downstream or upstream;
History of retrains;
History of bit swap or other real time adaptive features;
History of fast retrains and/or SOS's; or
Impedance;
DSL physical layer anomalies, defects and faults together with the event time stamps that has led to SOS activation, a fast retrain, a full retrain or a failed retrain;
SOS activation times, durations and average data rate loss;
INM (Impulse noise monitoring) histograms and impulse noise statistics;
echo transfer function or un-cancelled echo PSD; or
retransmission statistics; and
wherein the command signal comprises at least one of:
a minimum INP override instruction;
a target INP change instruction;
a Maximum delay override instruction;
a target delay change instruction;
a channel initialization policy override instruction;
an instruction to turn off specific downstream tones;
an instruction to change transmit power over specific downstream tones;
an instruction to force a CPE initiated re-training at a scheduled time;
an instruction to Lower the maxR;
an instruction to change maximum data rate;
an instruction to change target margin;
SOS triggering controls including controls on SNR margin degradations, FEC, code violation (CV), ES, and SES counts, and probability of bit error;
fast retrain triggering controls including controls on duration of LOS and LOF anomalies, SNR margin degradations, FEC, code violation (CV), ES, and SES counts, and probability of bit error;
full retrain triggering controls including controls on duration LOS and LOF anomalies, SNR margin degradations, FEC, code violation (CV), ES, and SES counts, and probability of bit error; or
retransmission controls including MIN and MAX FNP for different types of impulse noises (REIN or SHINE), MIN and MAX delay, FEC overhead ratio within a retransmission block, MAX throughout loss.

26. A computer readable storage media, comprising instruction stored thereon, which when executed by a processing system cause the system to perform the method of claim 20.

* * * * *